Dec. 10, 1968　　　G. N. KRUEGER　　　3,415,150
TRAVELING SAW

Filed Sept. 21, 1965　　　　　　　　　　　　8 Sheets-Sheet 4

INVENTOR
GLENN N. KRUEGER
BY
*Donald G. Dalton*
ATTORNEY

Dec. 10, 1968   G. N. KRUEGER   3,415,150
TRAVELING SAW
Filed Sept. 21, 1965   8 Sheets-Sheet 5
FIG.6
FIG.7
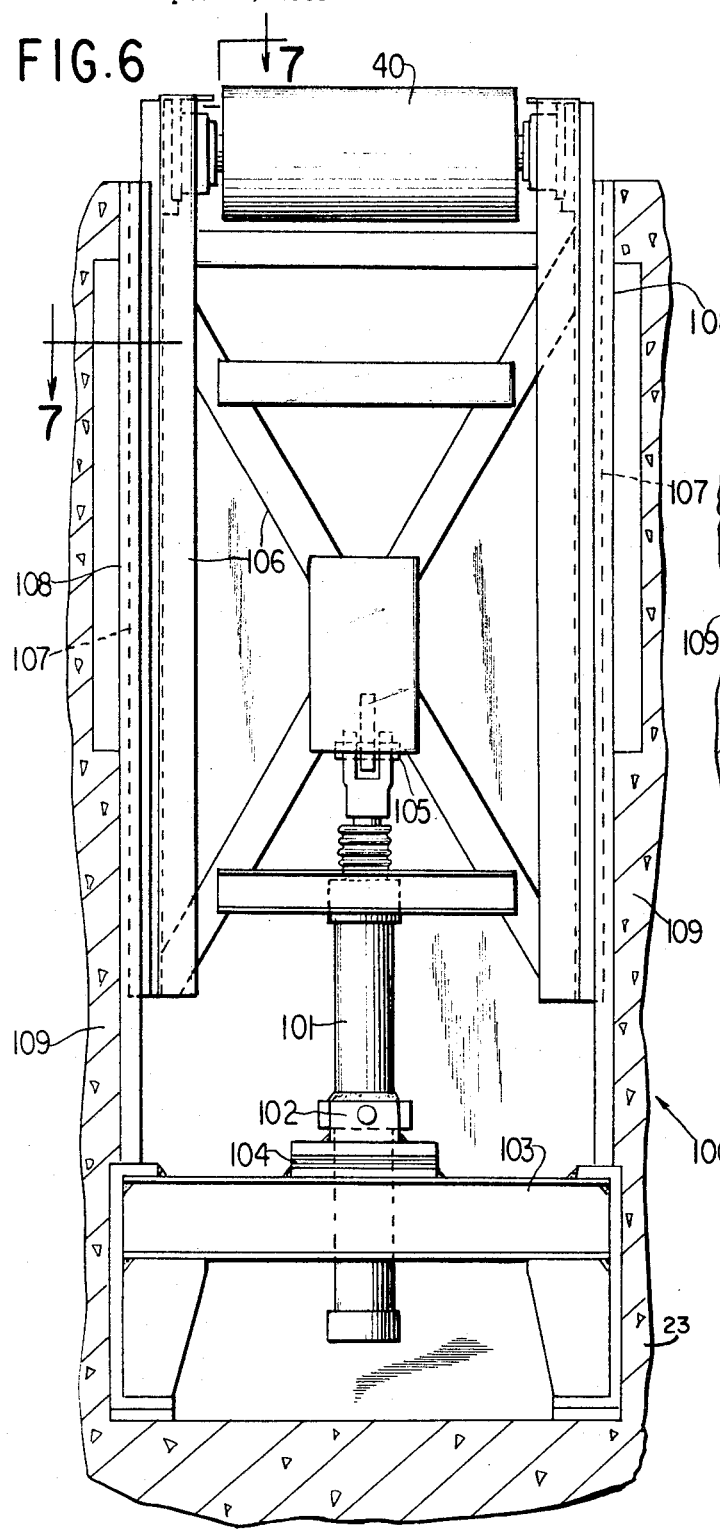
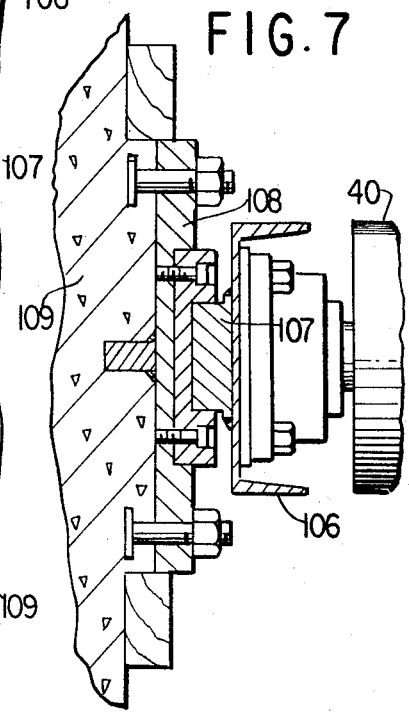
INVENTOR
GLENN N. KRUEGER
BY
*Donald G. Dalton*
ATTORNEY Dec. 10, 1968   G. N. KRUEGER   3,415,150
TRAVELING SAW
Filed Sept. 21, 1965   8 Sheets-Sheet 7

INVENTOR
GLENN N. KRUEGER
BY
ATTORNEY

Dec. 10, 1968     G. N. KRUEGER     3,415,150

TRAVELING SAW

Filed Sept. 21, 1965                                  8 Sheets-Sheet 8

INVENTOR
GLENN N. KRUEGER

BY
ATTORNEY

United States Patent Office 3,415,150
Patented Dec. 10, 1968

1

3,415,150
TRAVELING SAW
Glenn N. Krueger, Riverside Township, Cook County, Ill., assignor to United States Steel Corporation, a corporation of Delaware
Filed Sept. 21, 1965, Ser. No. 488,933
3 Claims. (Cl. 83—319)

ABSTRACT OF THE DISCLOSURE

Apparatus for sawing a traveling slab is supported on a main carriage mounted for limited movement along the path thereof. Above the path and spaced therealong, two downwardly engaging clamp means are disposed on the carriage. They are normally fixed but may be adjusted by jackscrews. Below the path and also disposed on the carriage are upwardly engaging movable clamp means actuated by fluid pressure cylinders toward and from the fixed clamping means. A saw-mounting carriage is movable on the main carriage transversely of the slab path and carries a rotary saw the plane of which is intermediate the two sets of upper and lower clamp means, and a tiltable head on which the saw is journaled. Conveyor rollers on the main carriage support the advancing slab when the carriage is in retracted or starting position. Auxiliary lower conveyor rollers may be advanced from out-of-the-way positions to engage and support the slab when the carriage is in such position that its rollers leave a portion of the slab unsupported.

---

This invention relates to apparatus for severing a continuously moving metal slab and more particularly to an apparatus for sawing into lengths a continuously moving hot-rolled steel slab formed by continuous casting.

It is an object of this invention to provide an apparatus for cutting continuously moving steel slabs which includes roller means carried by the cutting apparatus for supporting the steel slab while it is being cut, and cooperating retractable rollers dispersed over the length of travel of the cutting apparatus for supporting the steel slab.

It is a further object of this invention to provide a novel clamping mechanism for clamping the longitudinal carriage of the cutting apparatus to the slab.

According to the present invention, there is provided an apparatus for severing a continuously moving hot-rolled metal slab, which apparatus comprises a lonigtudinal carriage mounted on a stationary base for moving with the slab, clamp means for clamping the carriage to the slab for travel therewith, rollers on the carriage for supporting the slab, a lateral carriage mounted on the longitudinal carriage for travel transversely of the slab, a tilting block and a rotary saw blade mounted on the lateral carriage for severing the slab.

Figure 1:
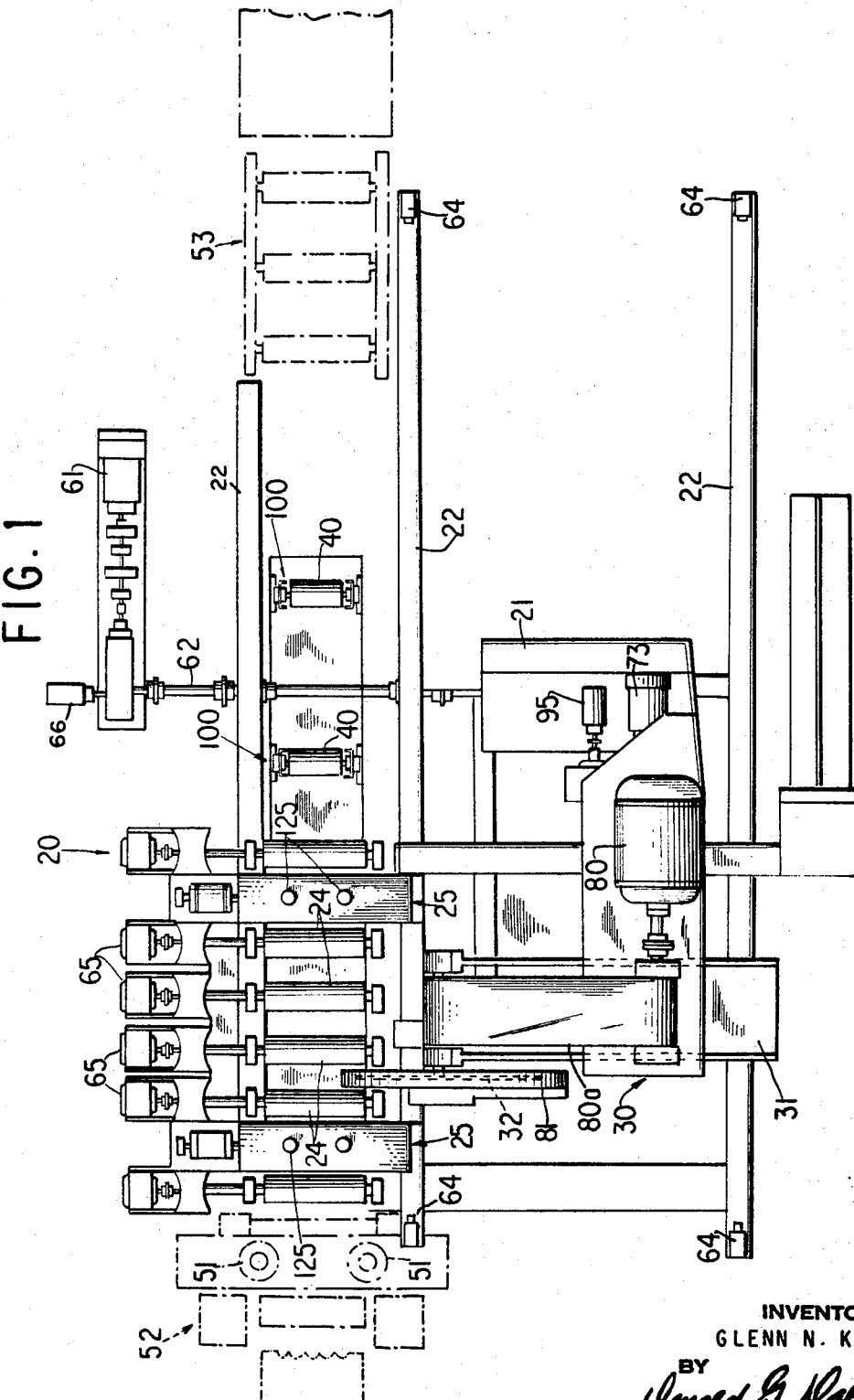
Figure 2:
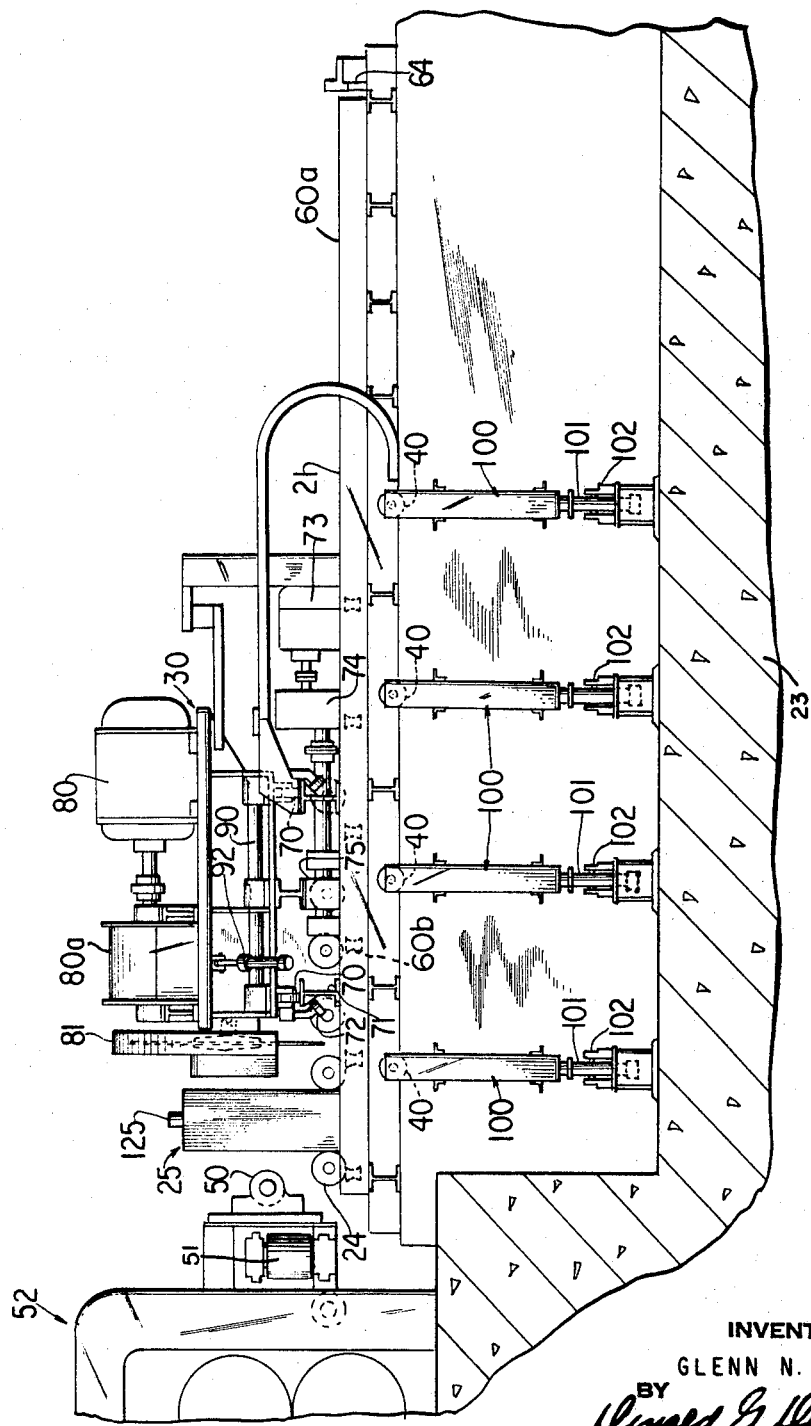
Figure 3:
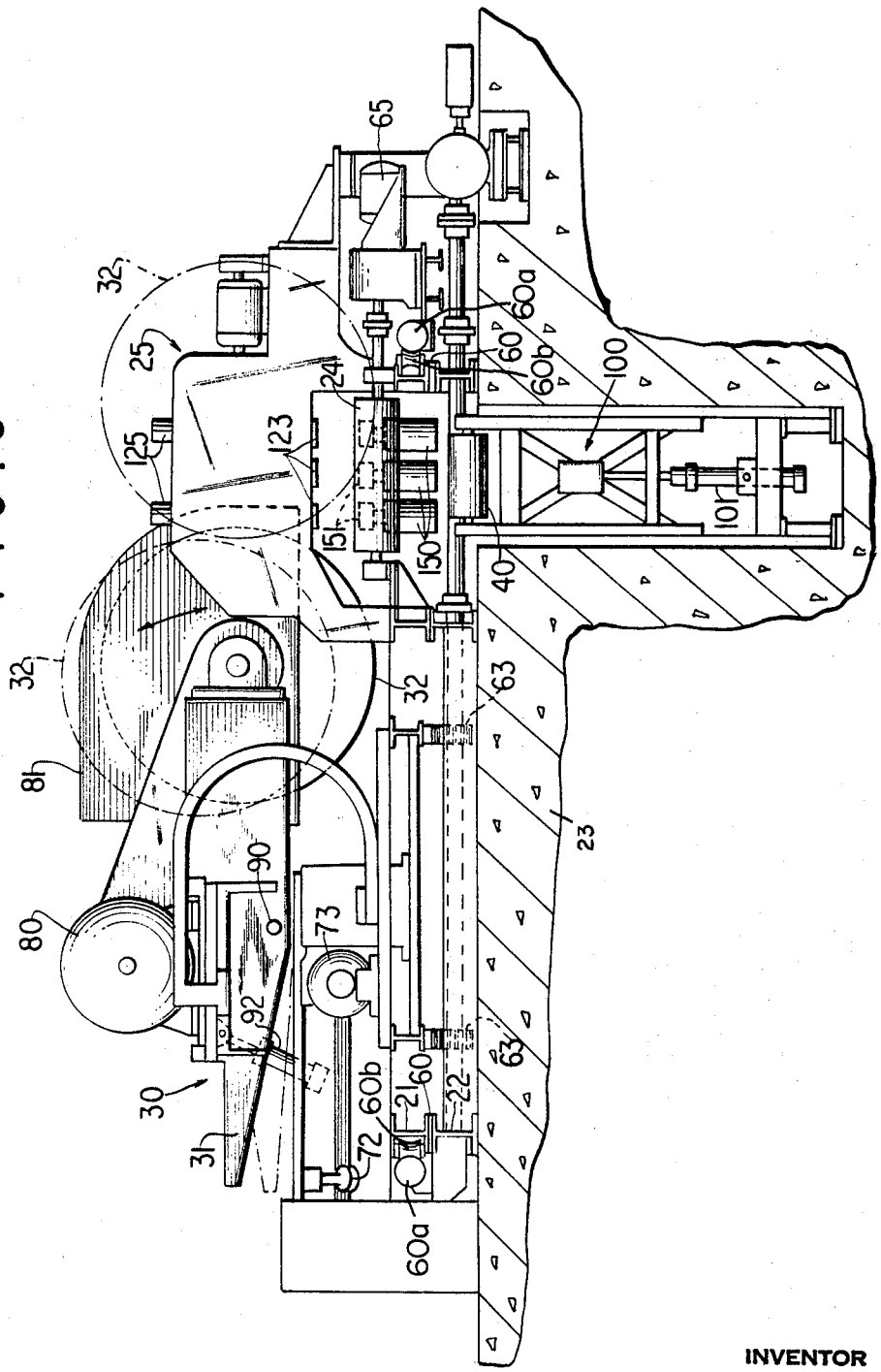
Figure 4:
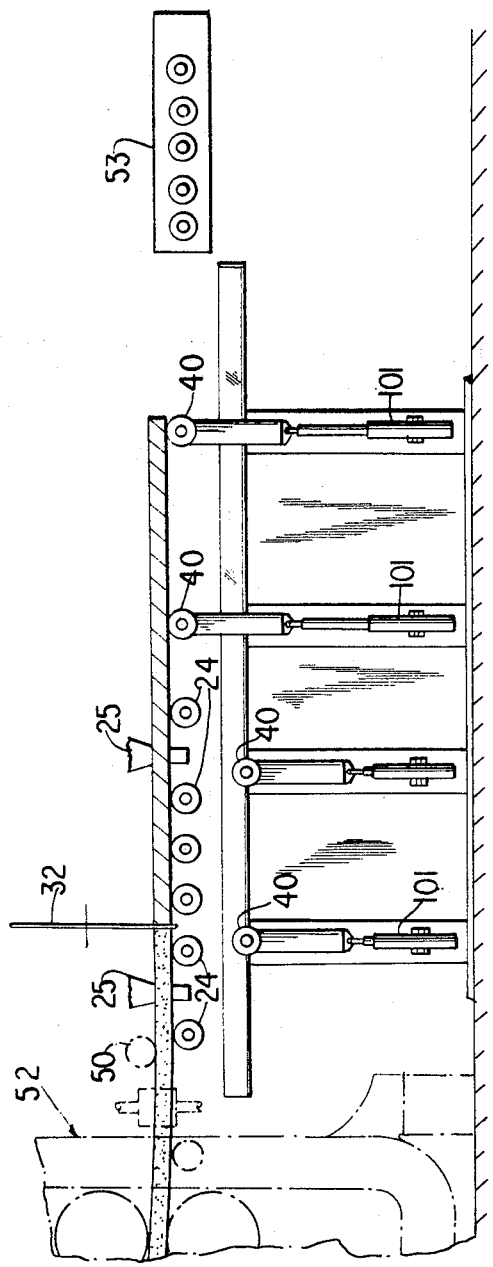
Figure 5:
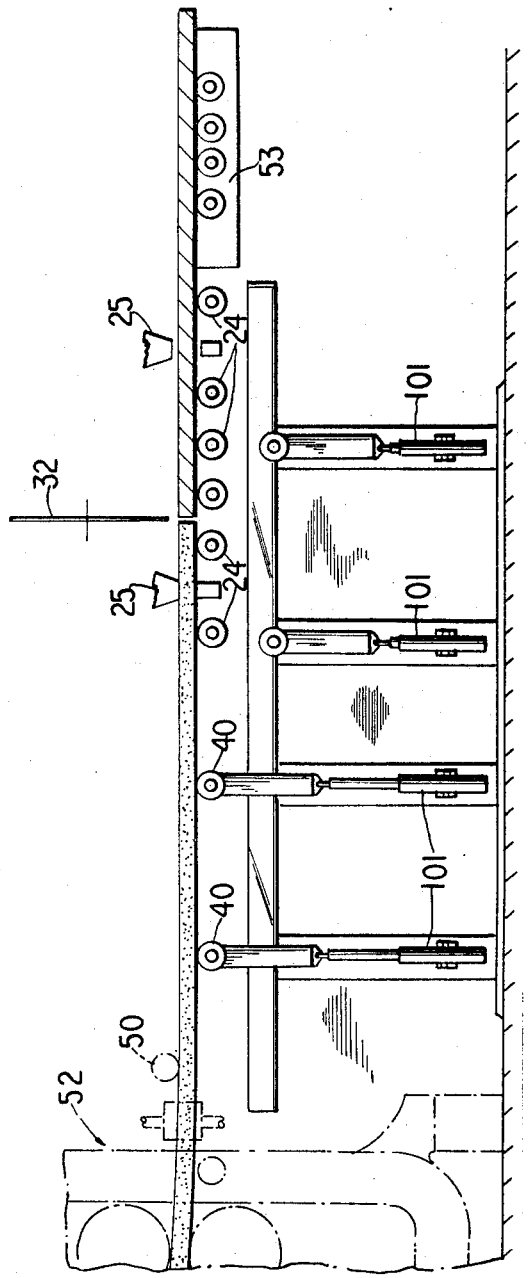
Figure 8:
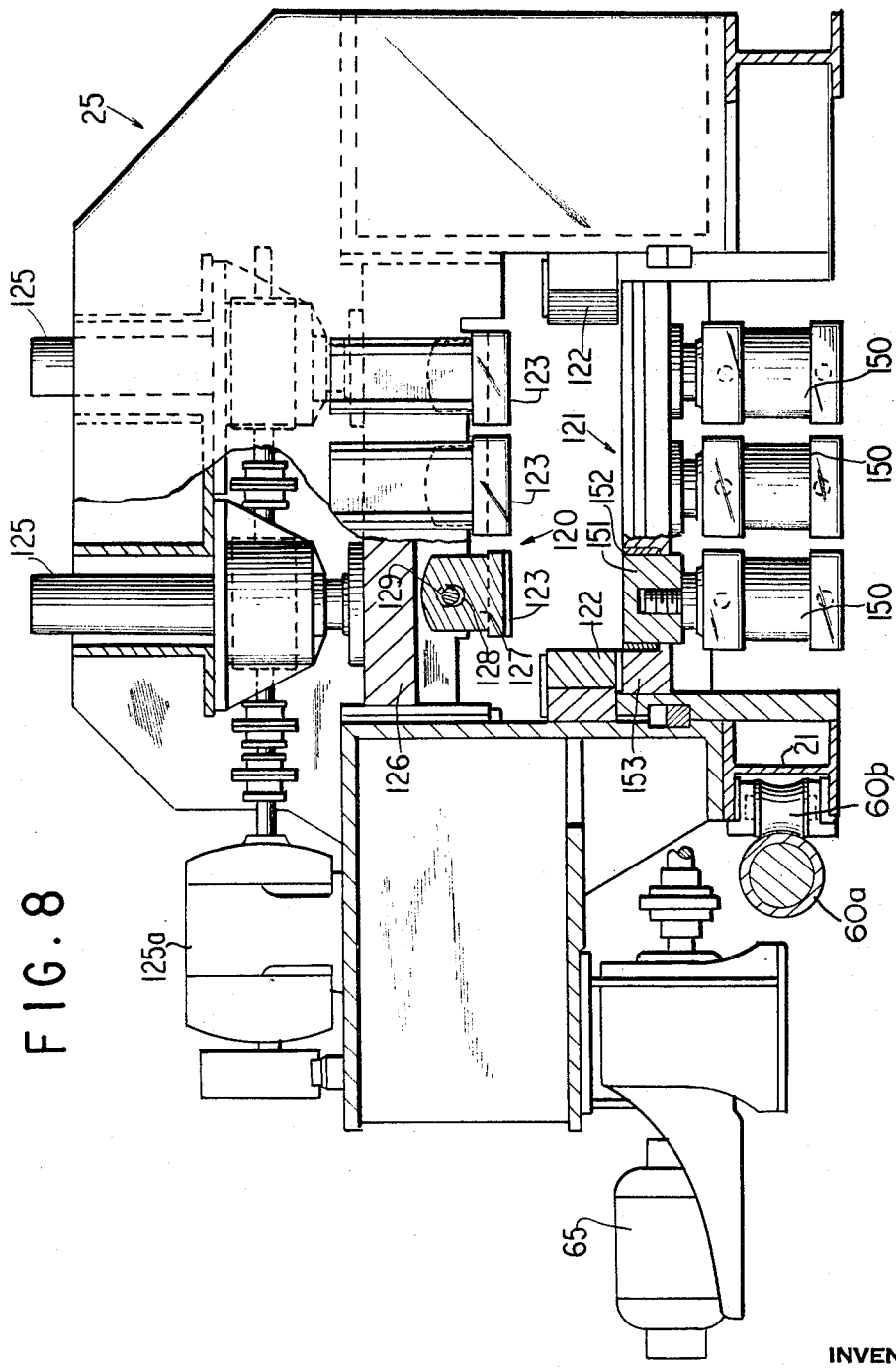
Figure 9:
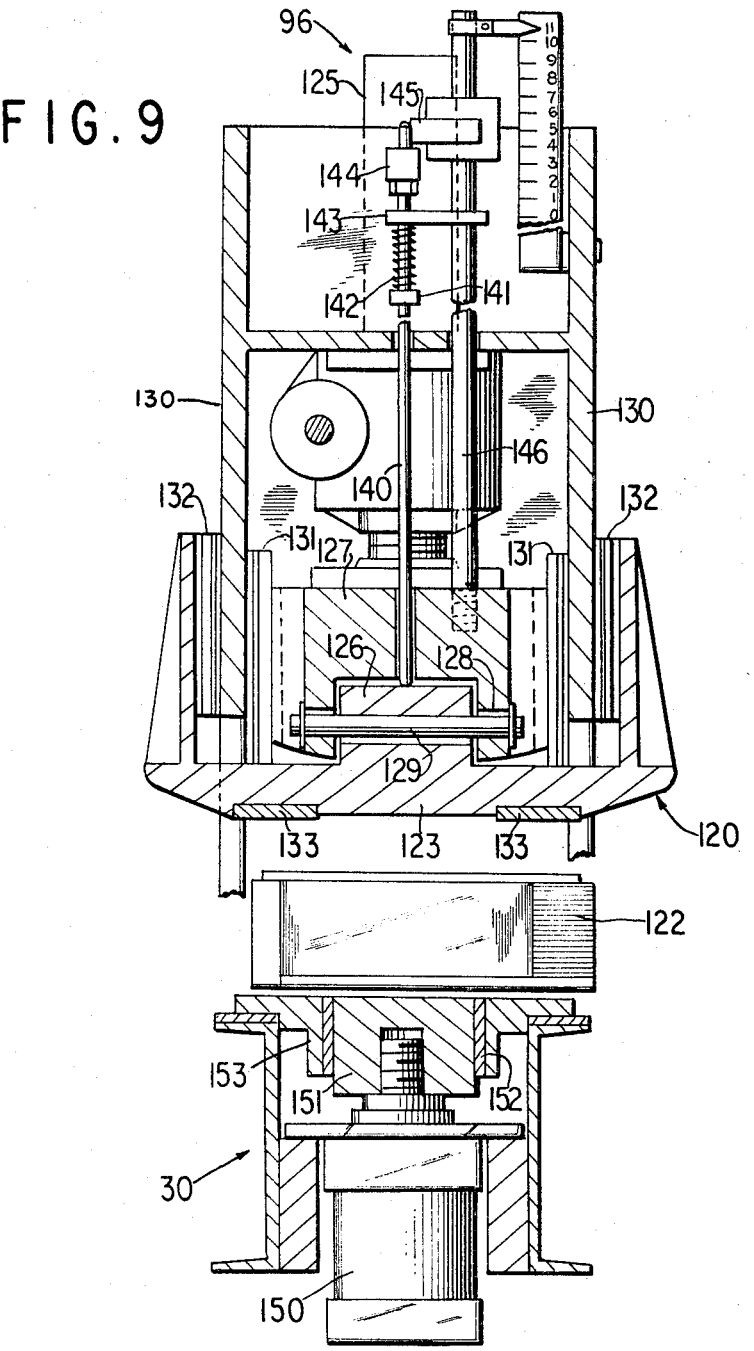

In the drawings:
FIG. 1 is a plan view of my invention.
FIG. 2 is a side elevation of the invention.
FIG. 3 is an and elevation of the invention.
FIGS. 4 and 5 are schematic views illustrating the advance of the longitudinal carriage and the sequential retraction and lifting of the retractable rollers for supporting the slab.
FIG. 6 is a side elevational view of the retractable roller mechanism.
FIG. 7 is a detail section, taken along line 7—7 of FIG. 6, showing the structure for guiding the vertical travel of the retractable rollers.
FIG. 8 is a side elevation, with parts cut away and parts shown in section of the clamping mechanism.
FIG. 9 is vertical section of the clamping mechanism of this invention.

2

Figure 10:
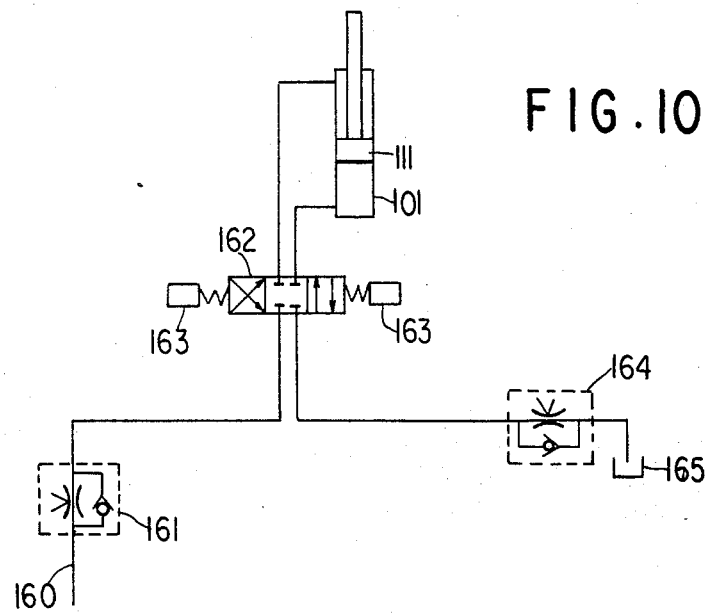
Figure 11:
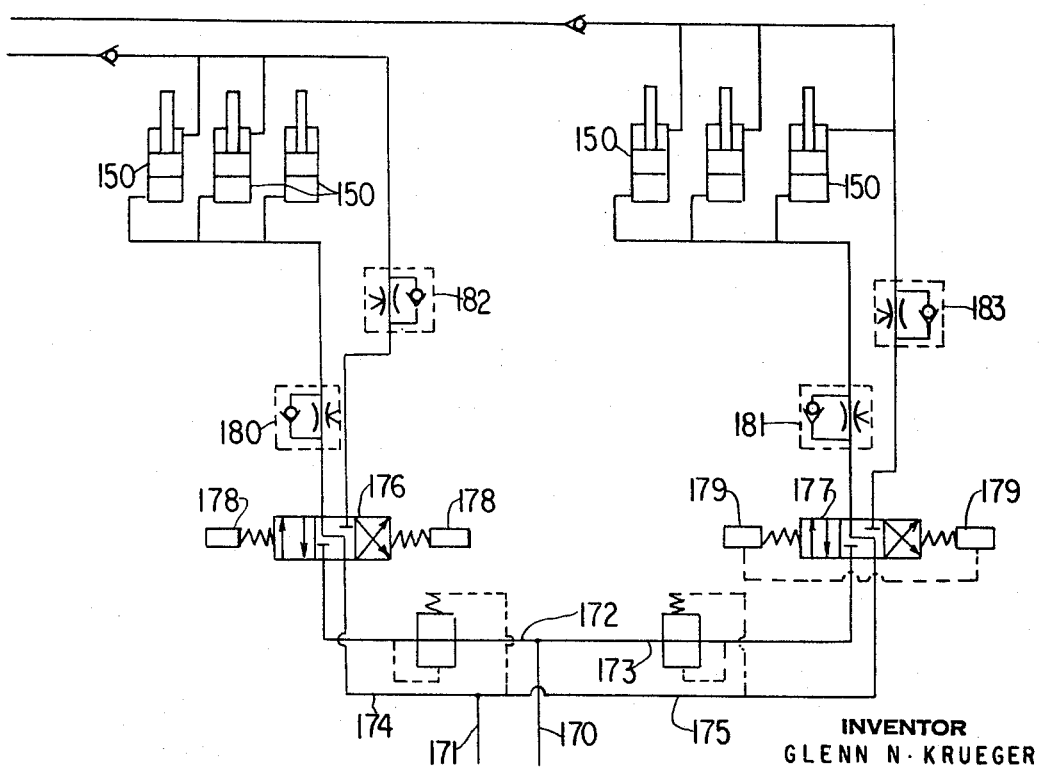

FIG. 10 is a diagrammatic view of the hydraulic system for operating the retractable rollers.
FIG. 11 is a diagrammatic view of the hydraulic system for controlling the lower clamps in the clamping mechanism.

Referring now to FIGS. 1, 2 and 3, and especially to FIG. 1, 20 indicates generally an apparatus for sawing a continuously moving hot-rolled steel slab into lengths, which comprises a longitudinal carriage 21 sliding on beams 22 mounted on a stationary base 23. Beams 22 extend parallel to the line of travel of the steel slab which is to be cut and a portion of the longitudinal carriage 21 extends under the line of travel of the slab. Carriage 21 includes a plurality of longitudinally spaced rollers 24 for supporting the steel slab as it travels thereover and carriage 21 also includes a pair of longitudinally spaced clamp assemblies 25 which clamp it to the continuously moving slab for travel therewith while said slab is being sawed.

A lateral carriage 30 is mounted on the longitudinal carriage 21 for travel transversely with respect thereto and to the slab to be severed. The lateral carriage 30 includes a tilting saw blade mount 31, and a rotary cross cut saw blade 32 for severing the slab while the longitudinal carriage 21 is clamped to the slab and traveling therewith.

It is necessary to support the slab at spaced points as it progresses along the line of travel of carriage 21. To this end a plurality of retractable rollers 40 are provided for vertical movement in sequence to afford support for those portions of the slab traveling through the area of the cutting apparatus 20 which are not supported by the rollers 24. The rollers 40 are particularly valuable in supporting the leading and trailing ends of a continuously cast steel slab.

A horizontal hold-down roll 50 and a pair of vertical edge rolls 51 at the entrance end of the cutting apparatus align the slab correctly for cutting. The slab enters the cutting apparatus from a rolling mill indicated generally at 52. A saw fill-in table 53 may be provided at the exit end of the cutting apparatus for carrying away the severed slab lengths.

The carriage 21 slides along beams 22, which have aluminum bronze anti-friction bearing surfaces 60 on their upper flanges. Movement of the carriage is guided by fixed rails 60a engaged by rollers 60b journaled on the carriage. This carriage 21 is driven by motor 61 through a drive mechanism 62 and a rack and pinion 63. The carriage 21 is prevented from overrunning the ends of track 22 by spring end stops 64 at each end of beams 22. Rollers 24 are driven by motors 65 to convey the slab through the cutting apparatus.

A cam limit switch 66 controls drive mechanism 62 in a manner to be explained, to effect the desired movements of carriage 21.

The lateral carriage 30 has wheels 70 which ride on beams 71 on longitudinal carriage 21. Lateral carriage 30 is prevented from lifting or riding off beams 71 by guide rollers 72 which are inclined at an angle and ride on guide surfaces on beams 71. The carriage 30 is driven by a motor 73 through reduction gearing 74 and rack and pinion 75.

Saw blade 32 is driven by a saw blade motor 80 through a belt 80a. A shield 81 surrounds all of saw blade 32 except the lower portion thereof.

Tilting block 31 is pivoted on pin 90. A hydraulic cylinder 92 controls the tilting thereof. When the mount 31 is in the position shown in FIG. 3, saw blade 32 is in sawing position. When saw blade 32 has sawn through the slab, actuation of hydraulic cylinder 92 causes saw blade 32 to be lifted upwardly by tilting of mount 31 so that the carriage 30 may be retracted back to its initial position for cutting another length of slab. The sequence of operations of carriage 30 is controlled by a cam limit switch 95 which causes it automatically to tilt down saw blade 32 to sawing position and then to commence lateral movement of the carriage 30 towards the slab after the slab and longitudinal carriage 21 have been clamped together by clamps 25. The cam limit switch also causes the saw blade 32 to be lifted after the slab has been cut and then causes carriage 30 to return to its initial position.

The cycle of operations of carriage 21 is controlled by cam limit switch 66 (FIG. 1). The cutting apparatus 20 is ready to receive a slab for cutting when the carriage 21 is at the rear of its travel, the first two retractable rollers 40 are retracted and the last two retractable rollers 40 are raised as shown in FIG. 4 to support the leading end of the casting as it advances. When the lead end of the slab has reached a predetermined position, its presence is detected by a hot metal detector, not shown. This detector initiates operation of the switch 66 which actuates clamps 25 by means of a hydraulic system to be hereinafter described. After clamps 25 have been engaged, carriage 21 (FIG. 2) rides with the slab to be cut. A proximity limit switch 96 actuated by the engagement of clamp 25, shown in FIG. 9, in a manner to be described initiates the lateral movement of carriage 30 and the sawing of the slab. As the advancing carriage 21 approaches, the two retractable rollers 40 nearest the exit end of the apparatus are lowered in sequence by conventional control means. The two retractable rollers 40 nearest the entrance end of the apparatus are raised in sequence by cam limit switch 66 after the rear end of longitudinal carriage 21 has passed thereover. Switch 66 also controls the return of longitudinal carriage 21 to the starting position when it reaches the forward end of its travel.

The details of the mechanism for operating one of the retractable rollers 40 are shown in FIG. 6. Each roller 40 is journaled at the top of an assembly 100 including a rectangular frame slidable vertically in base 23. The assembly 100 includes a hydraulic cylinder 101 which has a plurality of extensible sections and which is supported in pillow block 102. Pillow block 102 rests on a fixed supporting frame 103 and is spaced therefrom by shims 104 which permit leveling of cylinder 101 and allow for fine adjustment for positioning roller 40. The uppermost extension of cylinder 101 terminates in a clevis 105 which joins the vertically movable frame 106 to cylinder 101. Frame 106 (FIG. 7) has tongues 107 cooperating with vertically extending metal guideways 108 fixed in base 23.

Referring now to FIGS. 8 and 9, the mechanism for clamping carriage 21 to a continuously moving slab is shown. Each of the two clamps 25 includes an upper clamp assembly 120 for contacting the upper face of the slab, and a lower clamp assembly 121 for contacting the lower face of the slab. The slab is positioned laterally for clamping by means of side guides 122 carried by the lower clamp assembly 121.

The upper clamp assembly 120 includes three clamp shoes 123 aligned in a row extending transversely of the slab (FIG. 8) and is normally stationary but may be adjusted vertically as a unit by jack screws 125 driven by motor 125a. Each of the shoes 123 has a boss 127 with a hole 128 therein to receive pin 129 which secures boss 127 to clamping head 126 (FIG. 9). Head 126 extends the entire width of the upper clamp assembly 120 and of the slab to be cut. A slight clearance exists between the lower face of head 126 and the upper surface of shoe 123. However, the clearance between hole 128 and pin 129 is slightly larger, in order to prevent shearing of the pin 129.

The frame of longitudinal carriage 21 includes a pair of parallel vertical walls 130 extending transversely and enclosing the upper clamp assembly 120. A pair of bronze guideways 131 on the inside surfaces of walls 130 guide clamping heads 126 in their vertical movements. A pair of guideways 132 on the exterior of walls 130 guide the vertical movements of shoes 123 which preferably have bearing strips 133 in their lower faces.

Proximity limit switch 96 (FIG. 9) indicates when the slab and carriage 21 have been clamped together, at which time the movement of lateral carriage 30 (FIG. 3) is initiated. When clamp 123 moves upward at the time of clamping, head 126 strikes rod 140 (FIG. 9) which has a collar 141 and a compression spring 142 surrounding its upper end. An adjustable horizontal bar 143 pre-loads the compression spring 142 maintaining rod 140 in engagement with boss 127. An actuator block 144 mounted on the upper end of rod 140 contacts stop 145 which is mounted on upright rod 146 screw-threadedly received in boss 127. Upward movement of rod 140 striking stop 145 causes actuation of the switch 96, which in turn operates an electrical relay (not shown) causing forward movement of lateral carriage 30 and initiation of sawing. When the slab has been sawn, the switch 95 (FIG. 1) causes lifting of the saw blade and return of the lateral carriage 30 to its starting position. The exit clamp 25 is released by switch 66 and permits the cut piece to be removed by rollers 24 which are accelerated also by the cam limit switch. A time-delay circuit (not shown) then causes the entrance clamp 25 to open at a fixed time interval after the completion of sawing. Longitudinal carriage 21 is then returned to its starting position by switch 66.

The lower clamp assembly 121 (FIGS. 8 and 9) includes three hydraulic clamping cylinders 150 arranged in a row extending transversely of the longitudinal carriage 21. Actuation of these cylinders at the appropriate time causes the slabs to be gripped between upper and lower clamp assemblies 120 and 121 or the release thereof after severing is completed. The hydraulic mechanism which accomplishes this will be described hereinafter. The vertical movements of cylinder heads 151 attached to the pistons in clamping cylinders 150 are guided by cylindrical bushings 152 received in bridge blocks 153. Blocks 153 are part of the lower members of assemblies 25 which support cylinders 150.

The hydraulic system for controlling the operation of retractable rollers 40 is shown in FIG. 10. The system includes a supply conduit 160 for fluid under pressure. A flow control valve 161 permitting fluid flow in only one direction controls the passage of fluid from the high pressure source to several four-way valves 162 each controlled by a pair of solenoids 163 and shown herein in neutral position. The position of each four-way valve 162 determines the supply of fluid under pressure to cylinder 101 which controls the raising and lowering of one retractable roll 40. When fluid is supplied under pressure to the lower section of cylinder 101, the piston 111 therein is raised, lifting lower roller 40 (FIG. 6) to its slab-supporting position. Simultaneously the upper section of cylinder 110 (FIG. 10) is vented through control valve 164 to tank 165. Reversal of four-way valve 162 causes retraction of retractable roller 40. The solenoids 163 are operated in a predetermined time sequence so that rollers 40 are raised and lowered at the appropriate times as longitudinal carriage 21 advances.

FIG. 11 shows the hydraulic system for actuating the clamping cylinders 150 for one of the lower clamp assemblies 121. This system includes a supply conduit 170 for fluid under pressure and a return conduit 171 for low pressure fluid, which leads to a tank, not shown. The supply conduit 170 branches into a pair of conduits 172 and 173 leading to the entrance and exit clamp assemblies respectively. Likewise, return conduit 171 is formed by the junction of return conduits 174 and 175 from the entrance and exit clamp assemblies respectively. The entrance and exit clamp assemblies are controlled by four-way valves 176 and 177, respectively, each of which is actuated by a pair of solenoids 178 and 179 respectively. Flow control valves 180 and 181 in supply conduits 172 and 173 respectively, and flow control valves 182 and 183 in return conduits 174 and 175 respectively, control the flow of fluid to and from clamping cylinders 150. The use of flow control valves controls the speed of the pistons in cylinders 150 so that the movement of the assemblies 121 is not so rapid as to damage the slab. The pressure in cylinders 150 can be controlled so as to make possible vasiations in pressure depending on the temperature of the slab.

The operation of the apparatus of this invention is as follows:

A continuously cast steel slab of indefinite length continuously advances from rolling mill 52 (FIG. 1) into the area of cutting apparatus 20 of this invention. As the slab approaches, the carriage 21 is at its rearmost position, the two rear retractable rollers 40 are lowered, and the two front retractable rollers 40 are raised so that they are level with the support rollers 24 on carriage 21. The lifting means for thus positioning the two pairs of rollers 40 may be controlled by conventional means in accord with the position of carriage 21. The slab continues to advance, supported by rollers 24 and 40, until the leading end actuates a hot metal detector, not shown. This initiates the cutting cycle.

The clamps 25 are first actuated so that longitudinal carriage 21 travels with the slab. At this time, lateral carriage 30 (FIG. 3) is initially in its retracted position, with the saw blade 32 above and away from the path of the casting. As the clamps 25 are actuated, switch 96 is operated and, as a result, saw blade 32 is lowered and forward movement of lateral carriage 30 begins. This advances saw blade 32 toward the slab to be cut. Simultaneously saw blade 32 is set in motion.

When saw blade 32 has sawn through the slab, cam limit switch 95 causes saw blade 32 to be lifted and lateral carriage 30 to be returned to its original position. Meanwhile longitudinal carriage 21 has traveled forward until it is near the forward end of its travel. Rollers 24 are then accelerated to remove the sawn slab length. The unsawn slab behind saw blade 32 continues to advance at constant speed. As the lateral carriage 30 is being returned to its retracted starting position, cam limit switch 66 causes clamps 25 to be released and motor 61 to return longitudinal carriage 21 to its starting position. When longitudinal carriage 21 has been returned to its starting position and lateral carriage 30 has been returned to its starting position most remote from the path of the slab, then the apparatus is ready to cut another slab length. Again the hot metal detector initiates the operation of cutting apparatus 20 when the desired length of slab has traveled beyond the plane of saw blade 32.

The invention is especially valuable for cutting slabs of large cross-sectional area such as those obtained by continuous casting. Carriage rollers 24 support the slab when it is moving with respect to longitudinal carriage 21 and when the longitudinal carriage 21 is clamped to the slab for sawing. The support provided by rollers 24 prevents the slabs from sagging. Additional support for the slab is furnished by retractable rollers 40, which coact with carriage rollers 24 to support the entire length of slab passing through cutting apparatus 20.

While this invention has been described with reference to a specific embodiment thereof, it is to be understood that the scope of this invention shall be measured only by the appended claims.

What is claimed is:

1. A traveling saw comprising a main carriage, ways mounting said carriage for movement to and fro along the path of a moving workpiece to be severed, conveyor rollers journaled on said carriage adapted to support the workpiece as the carriage moves to and fro, a plurality of relatively fixed, downwardly engaging clamp means mounted on said carriage in spaced relation along said path at a level above that of the workpiece in said path, vertically movable upwardly engaging clamp means mounted on said carriage in vertical alinement with said fixed means at a level below that of the workpiece, means for actuating said movable clamp means to engage the workpiece between the fixed and movable clamp means, a saw-mounting carriage, means mounting said saw-mounting carriage on said main carriage for movement transverse to said path, a saw on said saw-mounting carriage in a plane between the clamp means, means for reciprocating said saw-mounting carriage, and means for vertically adjusting said relatively fixed clamp means, said adjusting means being a pair of jackscrews mounted on said main carriage.

2. A traveling saw comprising a main carriage, ways mounting said carriage for movement to and fro along the path of a moving workpiece to be severed, conveyor rollers journaled on said carriage adapted to support the workpiece as the carriage moves to and fro, a plurality of relatively fixed, downwardly engaging clamp means mounted on said carriage in spaced relation along said path at a level about that of the workpiece in said path, vertically movable upwardly engaging clamp means mounted on said carriage in vertical alinement with said fixed means at a level below that of the workpiece, means for actuating said movable clamp means to engage the workpiece between the fixed and movable clamp means, a saw-mounting carriage, means mounting said saw-mounting carriage on said main carriage for movement transverse to said path, a saw on said saw-mounting carriage in a plane between the clamp means, means for reciprocating said saw-mounting carriage, a set of auxiliary workpiece-supporting rollers below said path and means mounting said auxiliary rollers for vertical movement from an out-of-the-way position to a position in which they engage and support the workpiece.

3. An apparatus as defined in claim 2, characterized by said means mounting said auxiliary rolls being a plurality of rectangular frames, one for each roller, the roller of each frame being journaled in the upper end thereof, and including vertical ways cooperating with the sides of said frames.

References Cited

UNITED STATES PATENTS

| | | | |
|---|---|---|---|
| 3,267,783 | 8/1966 | Kepes | 83—319 X |
| 3,075,422 | 1/1963 | Schultz | 83—319 |
| 3,174,373 | 3/1965 | Gensman | 83—294 X |
| 3,190,162 | 6/1965 | Sonneland | 83—319 X |

ANDREW R. JUHASZ, *Primary Examiner.*

U.S. Cl. X.R.

83—294, 380, 483

UNITED STATES PATENT OFFICE
CERTIFICATE OF CORRECTION

Patent No. 3,415,150                      December 10, 1968

Glenn N. Krueger

It is certified that error appears in the above identified patent and that said Letters Patent are hereby corrected as shown below:

Column 1, line 47, "lonigtudinal" should read -- longitudinal --; line 58, "and" should read -- end --. Column 5, line 6, "vasiations" should read -- variations --. Column 6, line 30, "about" should read -- above --.

Signed and sealed this 10th day of March 1970.

(SEAL)
Attest:

Edward M. Fletcher, Jr.            WILLIAM E. SCHUYLER, JR.
Attesting Officer                    Commissioner of Patents